358-140. OR 3,067,282 SR SEARCH RO

Dec. 4, 1962 R. H. HAMMANS ET AL 3,067,282

TELEVISION SYSTEMS

Filed Nov. 23, 1959 9 Sheets-Sheet 2

Dec. 4, 1962 R. H. HAMMANS ET AL 3,067,282

TELEVISION SYSTEMS

Filed Nov. 23, 1959 9 Sheets-Sheet 4

Dec. 4, 1962 R. H. HAMMANS ET AL 3,067,282

TELEVISION SYSTEMS

Filed Nov. 23, 1959 9 Sheets-Sheet 5

Dec. 4, 1962 R. H. HAMMANS ET AL 3,067,282

TELEVISION SYSTEMS

Filed Nov. 23, 1959 9 Sheets-Sheet 6

Dec. 4, 1962 R. H. HAMMANS ET AL 3,067,282

TELEVISION SYSTEMS

Filed Nov. 23, 1959 9 Sheets-Sheet 9

United States Patent Office 3,067,282
Patented Dec. 4, 1962

3,067,282
TELEVISION SYSTEMS

Reginald H. Hammans, Cheedle Hulme, Leonard Holt, Prestbury, and Cyrus H. Babbs, Baguley, Manchester, England, assignors to Granada TV Network Limited, London, England Filed Nov. 23, 1959, Ser. No. 854,961
Claims priority, application Great Britain Nov. 25, 1958
18 Claims. (Cl. 178—6.8)

The present invention relates to apparatus for recording and/or reproducing electrical signals such as television signals and in particular to apparatus for recording and/or reproducing such signals with a conversion of standards.

The principal application of the invention is to television and it is in this application that the invention will herein be described, but it will be appreciated that the invention could be applied with advantage in other information communication systems and apparatus where considerations similar to those involved in television apply.

Due to the existence in different countries of television systems which operate with different standards, i.e. different numbers of lines per frame and/or different numbers of frames per second, recorded programme material produced for the system of one country cannot conveniently be used in another country or countries where the system standards are different.

The problem of differences in numbers of lines per frame is not so great as the problem of differences in frames per second but in both cases it is difficult to obtain a conversion which will result in a picture in which the contrast distribution and steadiness of the original picture is preserved.

It is the object of the present invention to provide an apparatus for effecting standards conversion which will overcome these difficulties.

According to the invention there is provided apparatus for converting electrical signals occurring in a first predetermined pattern into electrical signals occurring in a second predetermined pattern different from the first comprising means for recording the original signals in said first pattern, means for scanning the recorded signals in accordance with said second pattern and signal modulating means operative to modulate signals applied thereto in such a manner as to compensate for undesired changes in such signals introduced by the processes of recording and scanning.

Figure 1:
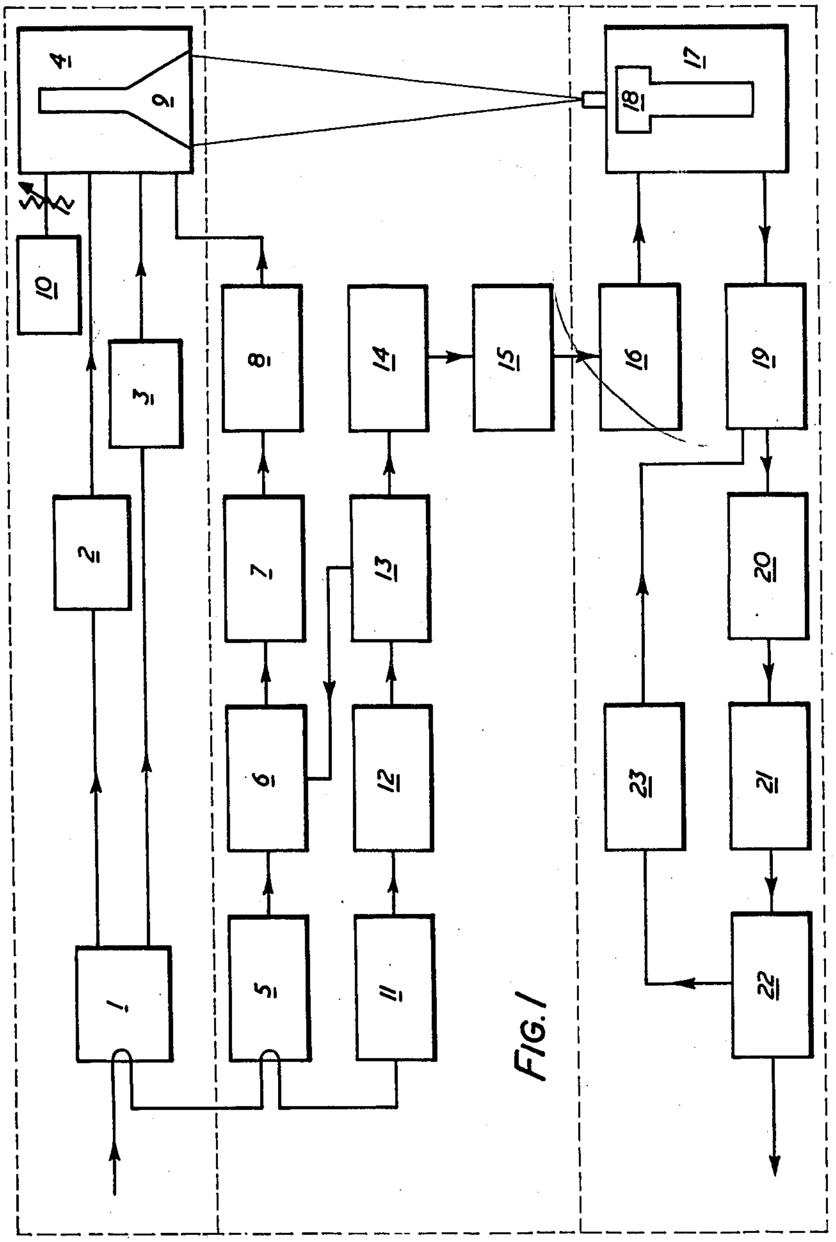
Figure 2:
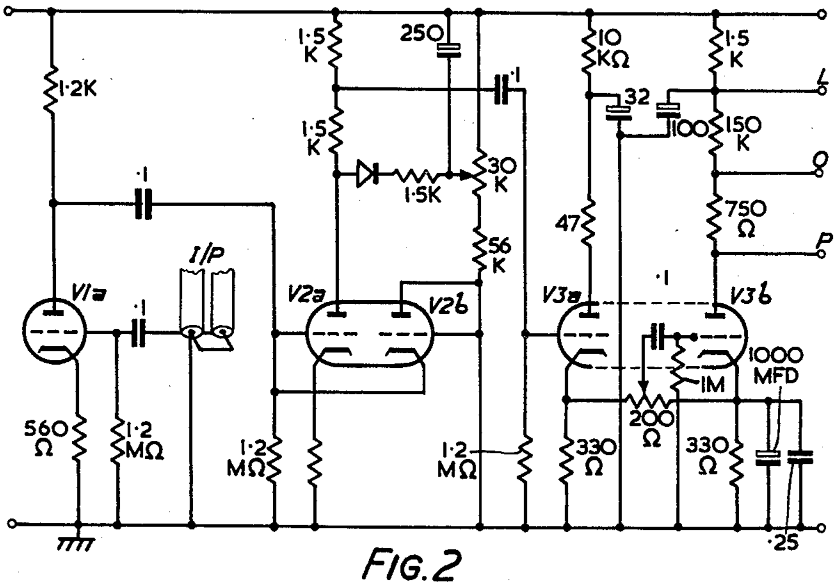
Figure 3:
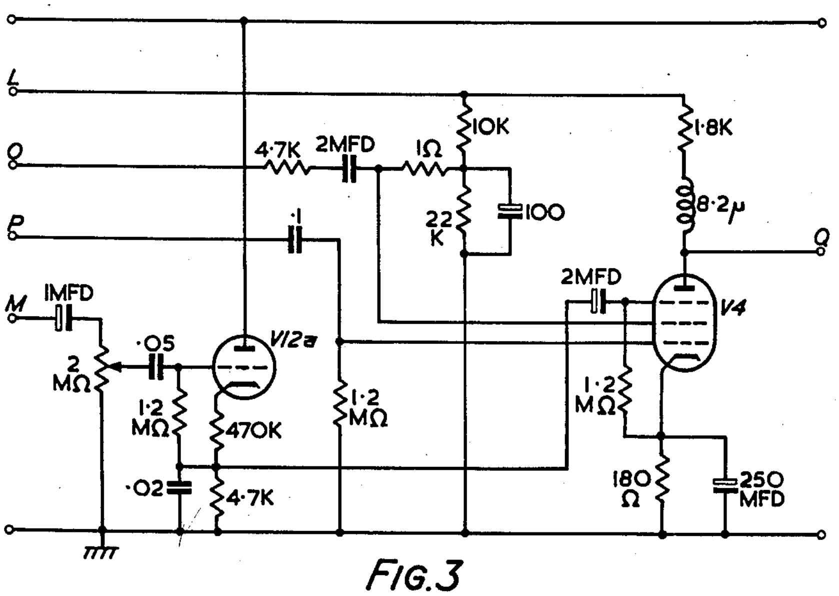
Figure 4:
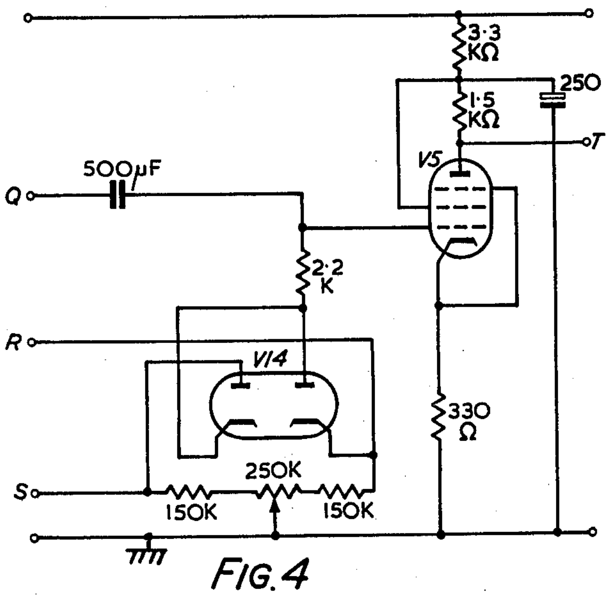
Figure 5:
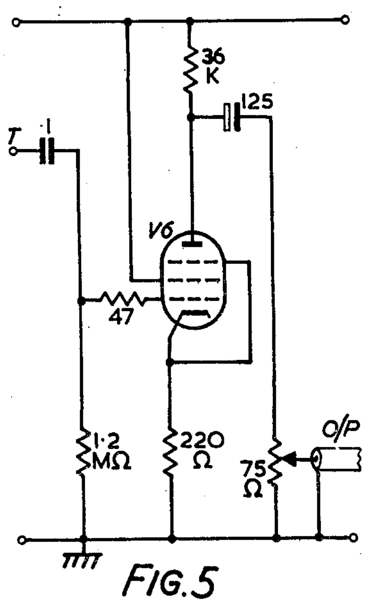
Figure 7:
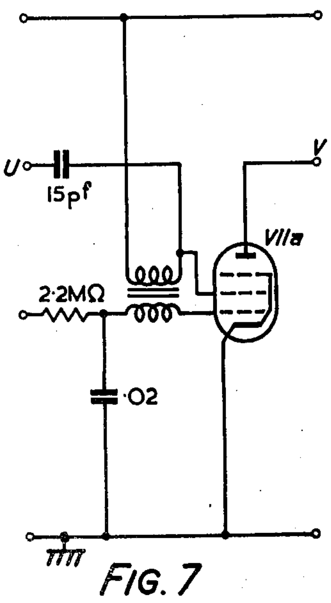
Figure 6:
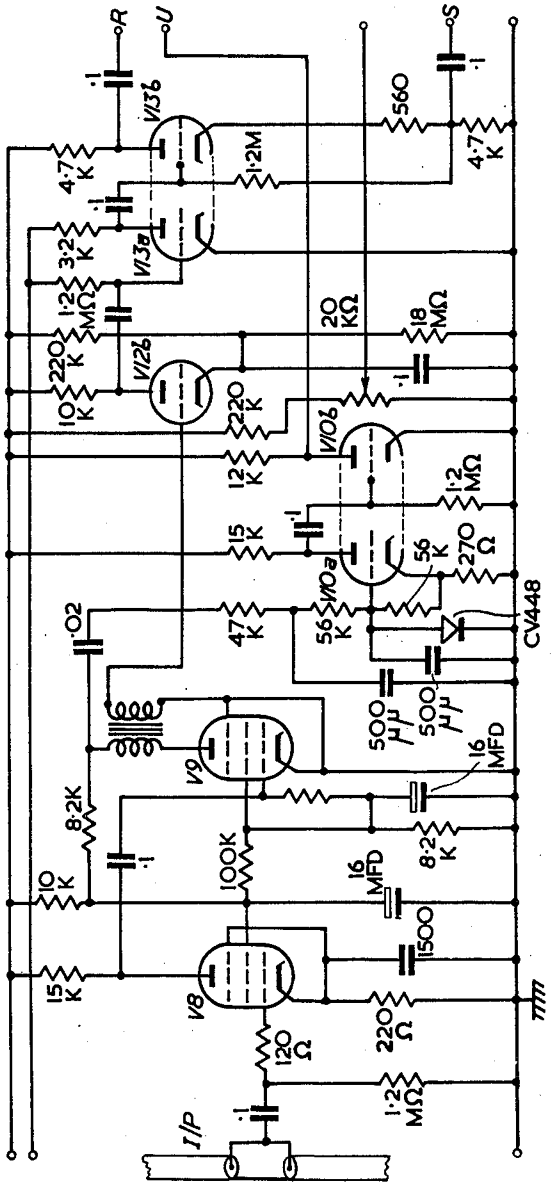
Figure 8:
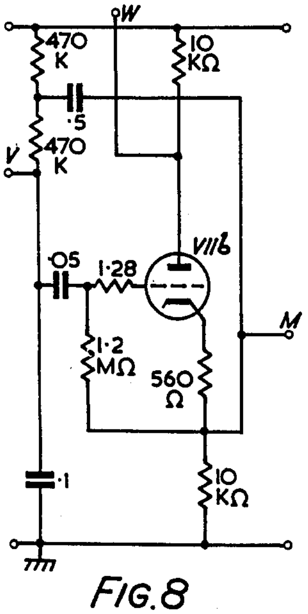
Figure 9:
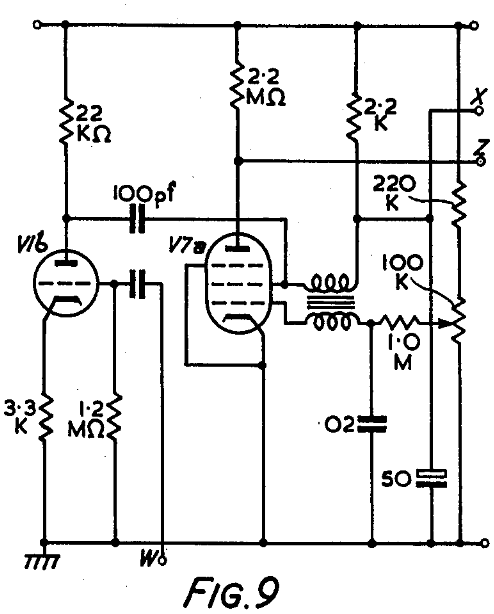
Figure 13:
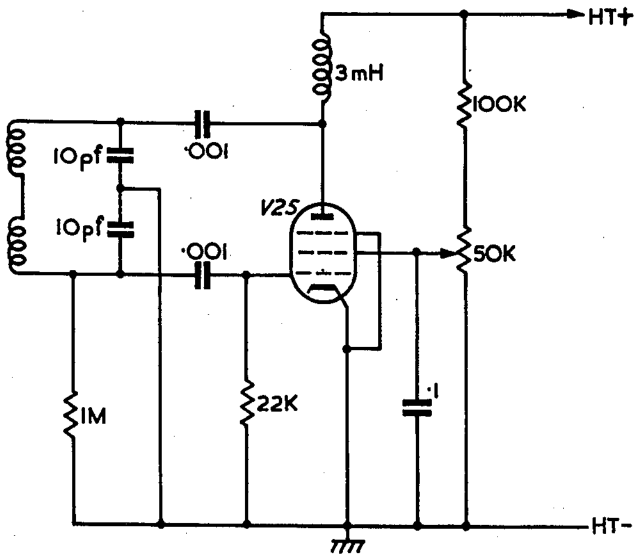
Figure 10:
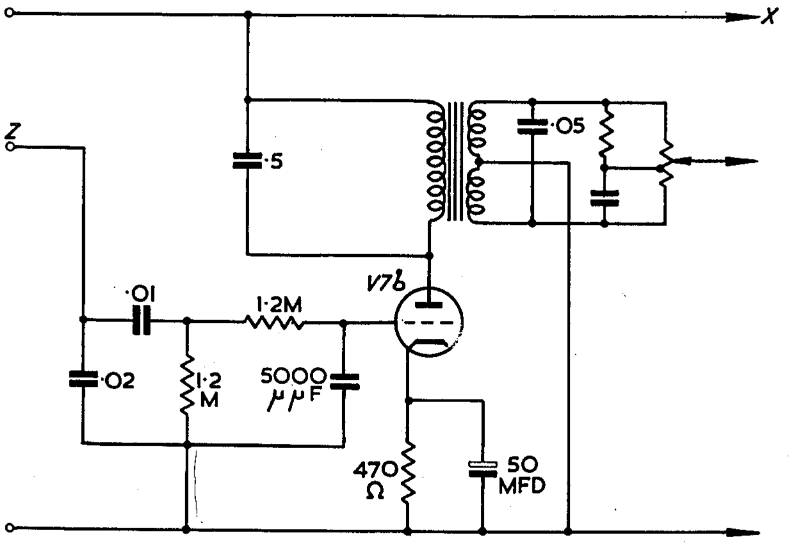
Figure 11:
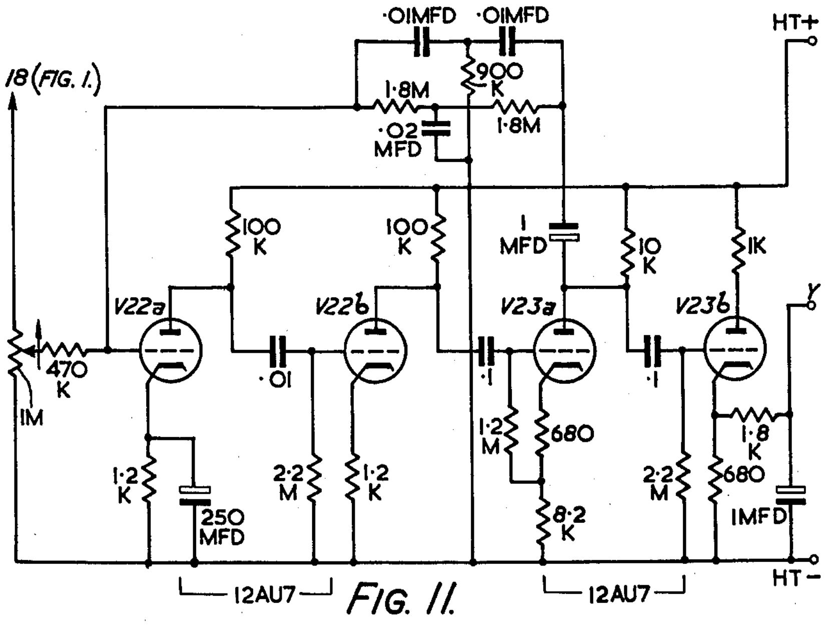
Figure 12:
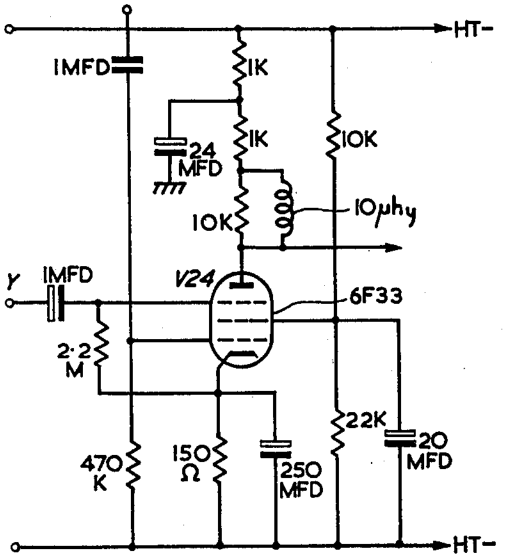

The various features and advantages of the invention will be apparent from the following description of an exemplary embodiment thereof which is illustrated in the accompanying drawings in which:

FIGURE 1 is a block schematic diagram of a complete conversion unit embodying the invention;

FIGURES 2 through 13 show detailed circuits of the various units indicated by blocks in FIGURE 1 which are additional to the conventional circuits employed in a display channel and a camera channel, and more particularly FIGURE 2 is a circuit diagram of a video amplifier and block stretch unit, FIGURE 3 shows a modulated video amplifier, FIGURE 4 a clamp circuit, FIGURE 5 a video output amplifier, FIGURE 6 a synchronization pulse separation unit, FIGURE 7 a blocking oscillator, FIGURE 8 a correction waveform generator, FIGURE 9 a frequency multiplying circuit, FIGURE 10 a phase control circuit, FIGURE 11 a frequency selective amplifier, FIGURE 12 a variable gain amplifier, and FIGURE 13 shows a spot wobble control circuit.

Figure 14:
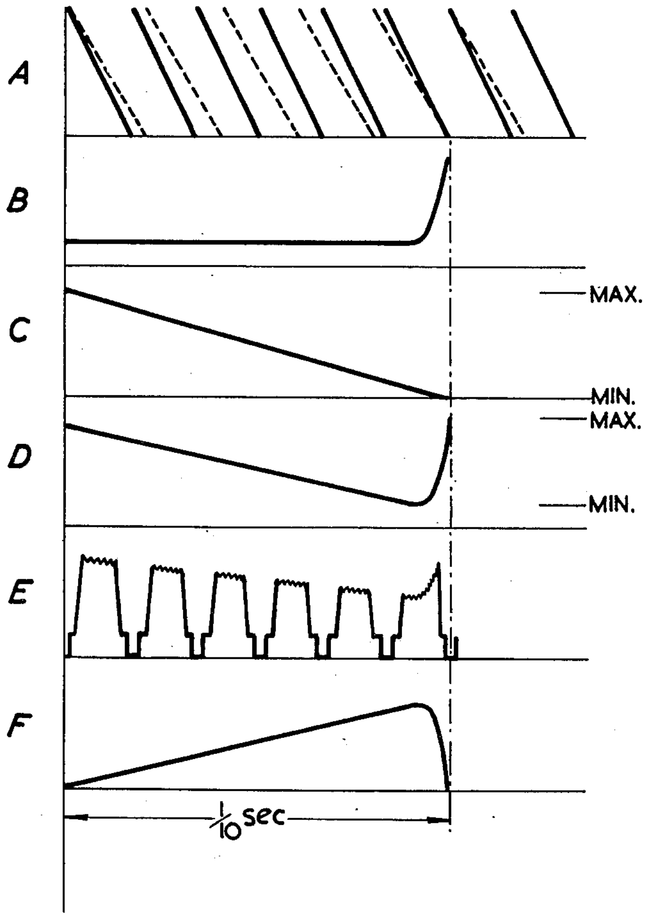
Figure 15:
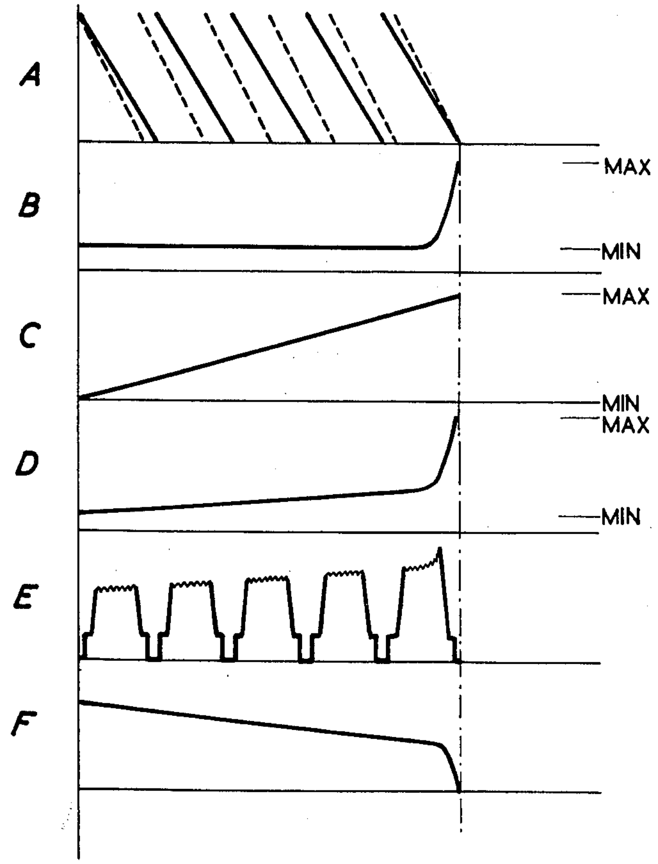

FIGURES 14 and 15 show various curves illustrating the undesirable effects arising from different frame repetition rates in television standards conversion, and the derivation of a suitable correction signal waveform.

The most difficult case of standards conversion is where the new standards are different in both line and frame from the original. Such is the case for example as between the 525 line 60 frames per second system currently in use in the United States of America and the 405 line 50 frames per second system currently in use in the United Kingdom, and conversion between these two standards will be described in detail hereinafter.

Taking first of all a conversion from U.S.A. standards to British standards the basic problem is to accept the video information contained in 525 lines occurring once every sixtieth of a second and to produce as much as possible of that information in 405 lines once every fiftieth of a second. The change in number of lines can readily be achieved by integrating the information of one 525 line frame as it is recorded, temporarily, on a display screen and then scanning the integrated picture on a 405 line pattern. The change in frame frequency can be accommodated in a number of ways. If sufficient picture storage capacity were available each integrated picture could be recorded separately and then scanned at the new frame rate. It will be immediately apparent however that each five seconds of original programme would become six seconds of converted programme, difficulties in correlating sound and action would be introduced, and the amount of storage required for a programme of any reasonable duration would be prohibitive.

The apparatus of the present invention is based upon the fact that the two frame waveforms move into coincidence once every tenth of a second during which interval the recording operation has occurred in six frames and the scanning operation of five frames has been effected and in both systems a new frame is started at the same time instant every tenth of a second. If one frame of original material is ignored in each tenth of a second no storage is necessary beyond that required to accommodate the maximum displacement between the instantaneous point of recording of signal picture material and the corresponding instantaneous point of scanning or "reading off" of such material within a one tenth second cycle.

A convenient manner of effecting the conversion is to record the original programme material by displaying it on a fluorescent screen in front of a television camera controlled to operate upon the standards of the converted material. By "spot-wobble" technique the display on the screen can be made devoid of the normal inter-line spacing and the effect is then to integrate the video information. The integrated picture can be scanned at the new line and frame rates without any substantial loss of definition and without flicker provided the characteristics of the screen and camera are taken into account as well as the mathematical relationship of the frame frequencies.

The important characteristic of the screen is its decay characteristic. It will be appreciated that within one frame of 525 lines some parts of the screen will have been activated to fluoresce for longer periods than others before they are "read" or scanned by the camera. Assuming a uniform decay characteristic over the picture surface of the display screen, this means that parts of the picture which had equal brightness when originally traced will have decayed to differing extents by the time such parts are scanned by the camera.

The important characteristic of the camera is what may be termed its "storage" effect which is due to the fact that the amplitude of signal obtained when a picture point is scanned is not only dependent upon the instantaneous light intensity of such point but upon the length of time such point has been illuminated prior to scanning. Thus where the scanning in the camera is progressively lagging further behind the scanning of the display tube in each frame during each one tenth second cycle picture points of initially equal intensity do not give rise to equal amplitude video signals from the camera because the spots are illuminated for unequal periods of time before being scanned.

A further characteristic of the system as a whole which is due to the mathematical relationship of the frame frequencies is that if the picture point being illuminated by the display tube beam is at the same instant scanned by the camera the resultant video signal from the camera is very much greater in amplitude than it would be if the two scans were not exactly coincident.

The foregoing considerations are demonstrated in FIGURES 14 and 15.

In FIGURE 14 there are shown a group of curves illustrating the operation of the system. All these curves are represented on a horizontal time axis of one tenth of a second. Curve A demonstrates the varying phase relationship between scans at 50 (dotted line) and 60 (full line) frames per second between two points of scan coincidence. It will be noted that when the 50 cycle scan has run from the top of the picture to the bottom (assuming horizontal scanning) the 60 cycle scan is already part way down the second frame and in subsequent frames it continues to move ahead of the 50 cycle scan until coincidence is reached at the end of a one tenth second scanning cycle.

Curve B represents the effect on an otherwise steady camera tube output of scan coincidence, the shape of the upward curve towards the end of the one tenth second cycle being determined by the decay characteristic of the display tube. Curve C represents the effect on camera tube output of signal build up due to the varying phase relation between the two different scans. Curve D shows the combined effects of both the factors illustrated in curves B and C, and curve E shows diagrammatically an un-compensated video waveform influenced by these two factors. Curve F shows the correction waveform required to compensate for the amplitude distortion exhibited in the curve E to produce a normal 60 frame video waveform.

It will be appreciated that the waveform or curves of FIGURE 14 are idealised for simplicity of illustration.

Although in the reverse form of conversion, i.e. from British to U.S.A. standards, the conditions are not exactly the same the effect of the same characteristics has to be compensated if a result which is strictly comparable with the original is to be obtained.

In this reverse form of conversion the camera starts to scan the first frame, just before the beam of the display tube starts to scan the second frame and the one frame difference is progressively reduced as the one tenth second cycle progresses until the two scans again coincide at a point just before the sixth display frame and the seventh camera frame. In both forms of conversion there is a continuously varying relationship between the recording scan of the display tube and the "reading" scan of the camera and it is the varying nature of this relationship in conjunction with the decay and storage characteristics referred to which has to be compensated. This reverse form of conversion involves the considerations demonstrated in FIGURE 15 which is otherwise similar to FIGURE 14.

The apparatus to be described takes into account the various characteristics referred to above firstly by providing a complex compensating waveform which is applied to the video signal channel of the display tube so as variably to intensify the picture elements over a period of one tenth of a second in a manner which will compensate for the decay characteristics of the screen and also the "storage" characteristic of the camera. Secondly the apparatus provides for phase adjustment between the scaning waveforms of the display tube and camera so that the coincidence of scanning which occurs once every tenth of a second takes place during the blanking period between frames and thus does not affect the video signal amplitude.

In general terms, the synchronization waveform of the original programme signals is separated out and applied to a frequency divider to produce a ten cycle per second waveform the shape of which is designed to produce the necessary compensation for decay and storage characteristics. This waveform is basically a linear sawtooth waveform with an exponential modulation. The output of the frequency divider is applied to a frequency multiplier which converts it to a sine waveform at the frequency of the frame rate of the converted programme. The sine waveform is applied to a synchronization generator for the converted standards through a variable phase shifter which operates to produce the necessary phase relationship between the two synchronization waveforms for coincidence to occur during a blanking period.

Referring now to FIGURE 1 the block schematic diagram is of a conversion unit for conversion of a 405 line 50 frame standard programme to a 525 line 60 frame programme. The input of synchronization and video signals is applied in common to three stages.

The first of these is a display synchronization separator circuit 1 which feeds the line scan and E.H.T. circuits 2 and the frame scan circuits 3 of the display unit 4.

The second of these is a display video amplifier and black stretch unit 5 which feeds a modulated video amplifier unit 6, a clamp unit 7, and a further video amplifier 8, arranged in series. The cathode ray tube 9 of the display unit receives its various inputs from the units 2, 3 and 8 and also from a 20 mc./s. spot wobble unit 10 which provides integration of the lines to form an integrated picture on the screen of tube 9. All of these units except the modulated video amplifier 6 may be of the conventional design normally used in a television monitor unit.

The third unit to which the input signals are applied is a converter synchronization separator unit 11 which feeds a frequency divider 12 arranged to divide the fifty cycle per second frame synchronization waveform by five and feed a ten cycle per second waveform to a correction waveform generator 13. Generator 13 applies its waveform to the modulated video amplifier 6 so that the video signal passing therethrough is modulated in such a manner that the picture displayed on tube 9 when scanned by the camera will provide a video output which does not exhibit the effects of the display tube decay and camera storage characteristics.

The waveform of generator 13 is also applied to a frequency multiplier 14 which introduces a multiplication by six and feeds, via a variable phase shifter unit 15, a 525 line 60 frame synchronization generator 16. The output of generator 16 controls the operation of the camera 17 which incorporates an image orthicon tube 18 providing an output to an anti-flutter variable gain amplifier 19. This amplifier 19 feeds an output amplifier and synchronization mixer unit 22 through a video amplifier 20 and a clamp unit 21 and is itself controlled by a difference frequency amplifier 23 fed from the output of the unit 22. The output at 525 lines 60 frames is taken from unit 22. The various units 16—18 and 20—22 are of conventional design commonly used in connection with image orthicon cameras.

It will be appreciated that whilst a separate display monitor and camera are shown in FIGURE 1 the invention could equally be applied in a conversion unit employing a tube in which the video information is applied to and read off from a single target electrode by two beams in a single envelope. In this case however the compensation waveform would be arranged to compensate for the operational characteristics of this type of tube instead of those of the separate display tube and camera. Also in the case of this type of tube coincidence of scanning even during flyback of the beams will produce larger than normal output signals and it is necessary to provide blanking arrangements which will effectively suppress these signals.

A conversion unit for operation from 525 line 60 frame to 405 line 50 frame would differ from that shown in FIGURE 1 principally in that the frequency divider would introduce a factor of six and the multiplier a factor of five and the nature of the compensating waveform would be such as to take into account the different scan relationship pertaining in this form of conversion, as shown in FIGURE 15F.

As previously mentioned the display channel comprising the stages 1, 2, 3, 4, 9 and 10 is largely of conventional design.

The unit 1 is the display channel synchronization signal separator, unit 2 is the line scan and EHT generator, unit 3 is the frame scan generator, 4 is the display unit incorporating the display tube 9. Unit 5 is a video amplifier and black stretch unit, 6 is a modulated video amplifier, 7 is a clamp unit and 8 a further video amplifier.

The display channel may for instance be a modified Marconi Display Monitor type BD878 with switchable standards using a Ferranti type 1403DB cathode ray tube having an afterglow characteristic of 25 milliseconds for 90% decay.

The camera channel or chain comprising the stages 16–23 is also largely of conventional design.

Unit 16 is a synchronization pulse generator controlling the scanning operation of the camera unit 17 which incorporates an image orthicon camera 18. The output of the camera is applied to an anti-flutter variable gain amplifier 19, a video amplifier 20, a clamp unit 21 and an output amplifier and synchronization mixing unit 22. Amplifier 19 is controlled from amplifier 22 via a frequency amplifier 23. The synchronizing generator 16 may for instance be a Marconi type BD689 with switchable standards, the rest of the camera channel being for instance a modified Marconi Mark III 4½" image orthicon camera channel employing an English Electric type P812 camera tube.

The stages 5–8 and 11–15 comprise the conversion stages and these together with the spot wobble unit 10 and the amplifier stages 19 and 23 of the camera channel are shown in detail in FIGURES 2 to 13.

Referring to FIGURE 2 which shows details of the video amplifier and black stretch unit 5 of FIGURE 1, the video input, by coaxial cable, is applied to the control grid of an amplifier V1*a* which feeds a further amplifier V2*a* where D.C. restoration to synchronization level is provided by the diode connected triode V2*b* and controllable black stretch is provided by a germanium diode connected in the anode circuit of V2*a*.

The modified video output of V2*a* is fed via a cathode follower V3*a* to an inverter V3*b* which provides the video input to the modulated video amplifier 6 shown in FIGURE 3. This unit 6 comprises a cathode follower V12*a* feeding a correction waveform from point M of the circuit of FIGURE 8 to the suppresssor of a short base suppressor modulation stage V4 which also receives a video input from stage V3*b*.

The modulated video output of V4 is fed to the clamp unit 7 shown in FIGURE 4 where it is applied via a clamp circuit constituted by stage V14 to the control grid of amplifier stage V5. The clamp circuit V14 serves to remove the large D.C. component of the modulated video waveform. The pulses used for clamp keying are derived from the synchronization separator 11 shown in FIGURE 6 as described later.

The output of stage V5 is fed to the video output amplifier 8 shown in detail in FIGURE 5. In this latter figure the input from stage V4 appears at point T and is applied to the control grid of pentode amplifier stage V6 the output of which provides the video modulation input of the display unit 4 of FIGURE 1.

Referring now to FIGURE 6, this shows the synchronization separator unit 11 of FIGURE 1 in detail. The unit takes the video input over coaxial cable, which input is applied to the control grid of stage V8 which, with stage V9, forms the synchronization pulse separator, both line and frame components being developed in the anode circuit of V9.

The frame component is passed via a low pass filter to the grid circuit of an amplifier stage V10*a* which, with a further amplifying stage V10*b*, serves to amplify and clean up the frame pulses from V9 and feed them to a blocking oscillator stage V11*a* (FIGURE 7).

The line component in the anode circuit of V9 is taken off via a transformer which differentiates the line pulses. The parts of the differentiated pulses which are not of the desired polarity are clipped off by stages V12*b* and V13*a* and the parts of desired polarity are fed to a phase splitting stage V13*b*. The pulses from V13*b* are applied to key the clamping of stage V14 (FIGURE 4) the timing of such pulses being such as to clamp the video waveform on the back porch.

As previously mentioned the frame pulses from stages V10*a* and V10*b* are fed to a blocking oscillator stage V11*a* shown in FIGURE 7. This stage is set to divide the frequency of the pulses applied to it by a factor of five in the example of conversion being described, but it will be appreciated that in conversion in the opposite direction it would be set to divide by a factor of six, and in other conversions it would be set to divide by an appropriate factor having regard to the difference between the two frame frequencies concerned. The anode of V11*a* provides a sawtooth voltage waveform at the divided frequency of ten cycles per second which is applied to the correction waveform unit 13 of FIGURE 1 shown in detail in FIGURE 8.

The stage V11*b* of FIGURE 8 serves as a "bootstrap" linearising cathode follower for the waveform applied to it from stage V11*a* and it feeds the linearised waveform via a level setting control to the cathode follower 12*a* of FIGURE 3. The sawtooth waveform amplitude modulates the video signal in the pentode stage V4 (FIGURE 3) which has shaping circuits between the screen and grid circuits to provide negative feedback.

The 10 c.p.s. waveform produced by stages V11*a* and V11*b* is also applied to the reference generator unit 14 of FIGURE 1 shown in detail in FIGURE 9. This unit comprises an inverter stage V1*b* to which the waveform is applied and which feeds a blocking oscillator stage V7*a* through a differentiating circuit. The stage V7*a* is set to multiply the frequency of the input waveform by a factor of six to provide a 60 c.p.s. pulse output. As with the blocking oscillator V11*a* of FIGURE 7 the factor of multiplication to which stage V7*a* is set will depend upon the frame frequencies of the conversion concerned but in the present example the factor is six. The pulses appearing at the anode of V7*a* are integrated and fed to the variable phase setter unit 16 of FIGURE 1 which is shown in detail in FIGURE 10.

This unit comprises a stage V7*b* including a flatly tuned transformer in its anode circuit which feeds the waveform applied from stage V7*a* to a phase setting network. The output of the network is a 60 c.p.s. sine wave locking waveform which is applied to control the operation of the synchronizing pulse generator 16 of FIGURE 1.

As mentioned earlier in this description the camera channel is largely of conventional design and a detailed description of all the stages in this channel is not thought to be necessary. Two stages of this channel which merit detailed description, however, are the frequency selective amplifier 23 and the anti-flutter variable gain amplifier 19. The details of these amplifiers are shown respectively in FIGURES 11 and 12.

Referring to FIGURE 11, this comprises three amplifier stages V22*a*, V22*b* and V23*a* interconnected in such a manner as to operate as a frequency selective amplifier taking a video input from the output amplifier 22 of the camera channel. The amplifier constituted by these three stages is tuned to the frequency of the common factor of the two frame frequencies which, in the case under consideration is 10 c.p.s. and any component at this frequency appearing in the output of amplifier 22 passes through the frequency selective amplifier and appears on the output of stage V23*a*. Such component is applied, through a cathode follower stage V23*b* to the suppressor of amplifier V24 of FIGURE 12.

The purpose of this arrangement is to eliminate any residual flutter which might otherwise be present in the camera channel output due to the mean correction applied at unit 6 being insufficient to compensate for differential variations due to secondary influences upon the characteristics of the system by the brightness of the scene in the picture. This provision illustrates the case of partial correction before recording and partial correction after scanning referred to earlier. The signals fed back through the amplifier 23 are applied in a sense to eliminate the flutter giving rise to them.

Referring to FIGURE 12, the stage V24 in addition to the suppressor input from stage V23*b* also receives a video input to its control grid from the image orthicon camera head 17 (FIGURE 1).

The spot wobble unit 10 of FIGURE 1 which provides picture integration is shown in detail in FIGURE 13 from which it will be seen that the circuit comprises a straightforward oscillator stage V25 arranged to oscillate at 20 mc./s. The oscillations are developed in two coils disposed on the neck of the display tube 9 of FIGURE 1 and the amplitude of these oscillations is variable by adjustment of the voltage applied to the screen grid of stage V25. The field developed by the oscillations in the coils deflects the spot of the tube 9 as it scans each line to an extent controlled by the oscillation amplitude control in the grid circuit of V25 such that the normal spacing between the lines of a frame are eliminated.

In the foregoing description of FIGURES 2–13 precise details of the functions of the individual components of the various circuits have been omitted since it will be readily apparent to anyone skilled in the art how these components perform these various functions. However, in the drawings, component values are given which have proved successful in experimental construction of the apparatus described. These values are given by way of example and other values might be employed with success.

In the preferred embodiment of the invention above described the principal modulation is applied to the modulated amplifier stage through which the input video signals pass before they are applied to the display tube. A further modulation may be applied to the anti-flutter amplifier if any residual flutter appears in the output of the camera channel. It will however be apparent that the modulating amplifier stage could be transferred from the display channel to the camera channel preferably between the camera unit and the anti-flutter amplifier. Moreover a modulating video amplifier could be provided in both the display and camera channels and a separate modulation waveform applied to each. In this case only the display tube characteristic need be compensated for in the display channel modulation and the camera "storage" characteristic could be compensated for in the camera channel modulation.

The input to the conversion equipment above described may be derived from a television camera televising a "live" scene or it may be derived from a record of a television programme. The output from the equipment may be applied as the video input to television transmitting equipment, for example in the relaying of television programmes between countries employing different standards, or it may be applied to video recording equipment such as, for example, a magnetic tape recording apparatus.

The invention thus finds application in relay-converter stations such as are used in transcontinental television transmission links and also in the production of recorded programme material occurring "live" or reproduced from an existing record.

We claim:

1. Apparatus for converting electrical signals arranged in a first sequential pattern into electrical signals arranged in a second sequential pattern different from said first pattern, comprising means for recording electrical signals in accordance with said first pattern, means for scanning the recorded signals in accordance with said second pattern, a correction signal generator for generating a repetitive correction signal the waveform of which is substantially the inverse of the waveform of the output signal generated by the scanning means in response to recording of a steady input signal, means for modulating said electrical signals under the control of said correction signal, and means for controlling the repetition rate of the correction signal generator in response to coincidence between the operation of said recording and scanning means.

2. Apparatus for converting television signals including video signals and first picture synchronization signals having a first repetition rate into corresponding television signals including second picture synchronization signals having a second repetition rate different from said first repetition rate, comprising means for recording video signals under the control of said first synchronization signals, means for scanning the recorded video signals under the control of second picture synchronization signals to generate corresponding output video signals, a correction signal generator for generating a repetitive correction signal the waveform of which is substantially the inverse of the waveform of the output signal generated by the scanning means in response to recording of a steady input video signal, means for modulating said video signals under the control of said correction signal, and means for controlling the repetition rate of the correction signal generator in response to coincidence between the operation of said recording and scanning means.

3. Apparatus according to claim 2 wherein said recording means comprises a cathode ray tube, and said scanning means comprises a television camera tube.

4. Apparatus for converting electrical signals comprising information signals and first synchronization signals arranged in a first fixed sequence into electrical signals arranged in a second fixed sequence different from said first sequence, comprising means for recording information signals under the control of said first synchronization signals, means for generating second synchronization signals arranged in said second fixed sequence under the control of said first synchronization signals, means for scanning the recorded information signals to generate information signals under the control of said second synchronization signals, a correction signal generator for generating a repetitive correction signal the waveform of which is substantially the inverse of the waveform of the output signal generated by the scanning means in response to recording a steady information signal, means for modulating said information signals under the control of said correction signal, and means for controlling the repetition rate of the correction signal generator in response to coincidence between the operation of said recording and scanning means.

5. Apparatus for converting television signals including video signals and first picture synchronization signals having a first repetition rate into television signals including second picture synchronization signals having a repetition rate different from said first repetition rate, comprising means for recording video signals under the control of said first picture synchronization signals, means for generating second picture synchronization signals under the control of said first picture synchronization signals, means for scanning the recorded video signals to generate corresponding video signals under the control of said second picture synchronization signals, a correction signal generator for generating a repetitive correction signal the waveform of which is substantially the inverse of the waveform of the output signal generated by the scanning means in response to recording a steady video signal, means for modulating said video signals under the control of said correction signal, means for varying the phase of said second picture synchronization signals relative to said first picture synchronization signals, whereby coincidence in recording and scanning takes place during simultaneously occurring first and second picture synchronization signal periods, and means for controlling the repetition rate of the correction signal generator in response to said first synchronization signals.

6. Apparatus according to claim 5 wherein said recording means comprises a cathode ray tube, and said scanning means comprises a television camera tube.

7. Apparatus for converting electrical signals including information signals and first synchronization signals arranged in a first fixed sequence into electrical signals arranged in a second fixed sequence different from said first sequence, comprising means for recording input information signals under the control of said first synchronization signals, means for scanning the recorded information signals to generate output information signals, a correction signal generator for generating a repetitive correction signal the waveform of which is substantially the inverse of the waveform of the output signal generated by the scanning means in response to recording a said input information signal, means for modulating said input information signals under the control of said correction signal, and means for controlling the repetition rate of the correction signal generator in response to coincidence between the operation of said recording and scanning means.

8. Apparatus according to claim 7 wherein said recording means includes a cathode ray tube, and said scanning means includes a television camera tube, and wherein the input information signals to said cathode ray tube are modulated under the control of said correction signal.

9. Apparatus according to claim 7 comprising means for generating a variable correction signal in response to said output information signals, and means for varying said output information signals under the control of said variable correction signal.

10. Apparatus according to claim 9 comprising a variable gain amplifier for said output information signals, and a frequency selective amplifier responsive to the output of said variable gain amplifier for varying the gain thereof.

11. Apparatus according to claim 2 comprising a scanning beam recorder for recording said video signals in the form of lined rasters, an oscillator for generating an alternating electrical signal of substantially higher frequency than the line repetition rate of said recorder, and means for deflecting said scanning beam laterally about the direction of its raster lines in response to said alternating electrical signal.

12. Apparatus for converting television signals including video signals and first picture synchronization signals having a first repetition rate into corresponding television signals including second picture synchronization signals having a second repetition rate different from said first repetition rate, comprising means for recording input video signals under the control of said first synchronization signals, means for generating said second picture synchronization signals under the control of said first picture synchronization signals, means for scanning the recorded video signals to generate corresponding output video signals under the control of said second picture synchronization signals, a correction signal generator for generating a repetitive correction signal the waveform of which is substantially the inverse of the waveform of the output signal generated by the scanning means in response to recording a steady input video signal, means for modulating said input video signals under the control of said correction signal, and means for controlling the repetition rate of the correction signal generator in response to coincidence between the operation of said recording and scanning means.

13. Apparatus according to claim 12 comprising means for varying the phase of said second picture synchronization signals relative to said first picture synchronization signals, whereby coincidence in recording and scanning takes place during simultaneously occurring first and second picture signal periods.

14. Apparatus according to claim 12 comprising means for generating a variable correction signal in response to said output video signals, and means for varying said output video signals under the control of said variable correction signal.

15. Apparatus according to claim 14 comprising a variable gain amplifier for said output video signals, and a frequency selective amplifier responsive to the output of said variable gain amplifier for varying the gain thereof.

16. Apparatus according to claim 12 comprising a scanning beam recorder for recording said video signals in the form of lined rasters, an oscillator for generating an alternating frequency of substantially higher frequency than the line repetition rate of said recorder, and means for deflecting said scanning beam laterally about the direction of its raster lines in response to said alternating electrical signal.

17. Apparatus according to claim 16 wherein said scanning beam recorder comprises a cathode ray tube, and said means for scanning video signals recorded therein to generate output video signals comprises a television camera tube.

18. Apparatus according to claim 12 wherein said correction signal generator comprises a blocking oscillator responsive to said first picture synchronization signals to produce oscillations at a repetition frequency which is a common factor of said first and second repetition rates.

References Cited in the file of this patent

UNITED STATES PATENTS 2,813,148 Pensak ---------------- Nov. 12, 1957

OTHER REFERENCES

Publication: "Standards Converter For International TV," A. V. Lord Electronics, vol. 26, August 1953, pp. 144 to 147.